United States Patent
Seats et al.

(10) Patent No.: US 7,989,557 B2
(45) Date of Patent: Aug. 2, 2011

(54) SURFACE IMPROVER FOR REINFORCED COMPOSITE COMPOSITIONS

(75) Inventors: Robert L. Seats, Powell, OH (US); Carroll G. Reid, Louisville, KY (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 0 days.

(21) Appl. No.: 12/899,083

(22) Filed: Oct. 6, 2010

(65) Prior Publication Data

US 2011/0034631 A1 Feb. 10, 2011

Related U.S. Application Data

(62) Division of application No. 12/288,656, filed on Oct. 22, 2008, now Pat. No. 7,834,101, which is a division of application No. 10/512,802, filed as application No. PCT/US2003/13009 on Apr. 24, 2003, now abandoned.

(60) Provisional application No. 60/375,944, filed on Apr. 25, 2002.

(51) Int. Cl.
*C08L 33/08* (2006.01)
*C08L 63/10* (2006.01)
*C08L 67/06* (2006.01)
*C08L 71/02* (2006.01)
*C08L 75/14* (2006.01)

(52) U.S. Cl. ........ 525/438; 525/107; 525/131; 525/176; 525/187; 525/227; 525/454; 525/531

(58) Field of Classification Search ........................... None
See application file for complete search history.

(56) References Cited

U.S. PATENT DOCUMENTS

| | | | | | |
|---|---|---|---|---|---|
| 2,940,944 | A | * | 6/1960 | Christenson | 525/154 |
| 3,516,955 | A | * | 6/1970 | Taft | 525/21 |
| 4,314,917 | A | * | 2/1982 | Wolfrey | 523/458 |
| 4,477,512 | A | * | 10/1984 | Thomas et al. | 442/180 |
| 4,486,561 | A | * | 12/1984 | Chung et al. | 524/107 |
| 4,525,498 | A | * | 6/1985 | Atkins et al. | 523/511 |
| 4,551,485 | A | * | 11/1985 | Ragan et al. | 523/212 |
| 4,585,833 | A | * | 4/1986 | Domeier | 525/260 |
| 4,665,111 | A | * | 5/1987 | Hussain et al. | 523/428 |
| 5,158,989 | A | * | 10/1992 | Ogitani et al. | 522/77 |
| 6,136,497 | A | * | 10/2000 | Melisaris et al. | 430/269 |
| 6,194,490 | B1 | * | 2/2001 | Roth et al. | 523/443 |
| 6,268,403 | B1 | * | 7/2001 | Crivello | 522/31 |
| 6,749,927 | B2 | * | 6/2004 | Cooray | 428/209 |
| 6,949,297 | B2 | * | 9/2005 | Yang et al. | 428/520 |
| 2003/0075253 | A1 | * | 4/2003 | Serra et al. | 152/525 |

FOREIGN PATENT DOCUMENTS

| | | | | |
|---|---|---|---|---|
| EP | 383609 | B1 | * | 5/1996 |
| JP | 61-108639 | A | * | 5/1986 |
| JP | 4-136020 | A | * | 5/1992 |
| JP | 7-90165 | A | * | 4/1995 |
| WO | WO 91/16200 | A1 | * | 10/1991 |
| WO | WO 96/37363 | A1 | * | 11/1996 |
| WO | WO 99/41296 | A1 | * | 8/1999 |

* cited by examiner

*Primary Examiner* — Robert Sellers
(74) *Attorney, Agent, or Firm* — Mark A. Montana

(57) ABSTRACT

The invention is a composition comprising a blend of two or more epoxide containing compositions selected from epoxidized vegetable oils, epoxidized alkyl esters or cycloaliphatic epoxides. In another embodiment, the invention is a blend of one or more epoxidized vegetable oils, epoxidized alkyl esters, or cycloaliphatic epoxides with one or more aromatic epoxides or epoxy functionalized polyoxyalkylene polyols.

8 Claims, No Drawings

SURFACE IMPROVER FOR REINFORCED COMPOSITE COMPOSITIONS

This application is a divisional application of U.S. patent application Ser. No. 12/288,656, filed Oct. 22, 2008, which issued on Nov. 16, 2010 as U.S. Pat. No. 7,834,101, which was a divisional application of U.S. patent application Ser. No. 10/512,802, filed Aug. 22, 2005, which was abandoned. U.S. patent application Ser. No. 10/512,802 was a National Stage entry claiming the benefit of International Application No. PCT/US2003/13009, filed on Apr. 24, 2003, which claims the benefit of U.S. Provisional Application No. 60/375,944, filed Apr. 25, 2002. U.S. patent application Ser. Nos. 12/288,656; 10/512,802 and 60/375,944 are incorporated herein by reference in their entirety.

The present invention relates to surface improver compositions useful in thermosetting compositions, for instance, unsaturated polyester and vinyl ester based molding compounds. It also relates to the thermosetting compositions containing the surface improver compositions.

Several groups of compounds have been identified as improving the surface smoothness of molded polyester and vinyl ester based reinforced composites. These compounds range in composition and include epoxy compounds, poly-capped oligomer adducts of long chain fatty acids with multi hydroxyl functionality or multi epoxy functionality, and others. See Atkins U.S. Pat. No. 4,525,498. These compounds when used with thermoplastic additives, such as polyvinyl acetate based thermoplastic compositions, improve the shrinkage control and surface smoothness of molded polyester and vinyl ester based reinforced composites.

Despite the improvement in surface smoothness which these compositions impart to molded thermosetting compositions, such as polyester and vinyl ester based reinforced composites, such molded composites do not present as smooth a surface as metals. Thus, there is a need for further improvement of the surface smoothness of such molded composites.

The invention is a composition comprising a blend of two or more epoxide containing compositions selected from epoxidized vegetable oils, epoxidized alkyl esters or cycloaliphatic epoxides. In another embodiment, the invention is a blend of one or more epoxidized vegetable oils, epoxidized alkyl esters, or cycloaliphatic epoxides with one or more aromatic epoxides or epoxy functionalized polyoxyalkylene polyols. Reference to two or more epoxide compositions containing compositions selected from epoxidized vegetable oils, epoxidized alkyl esters and cycloaliphatic epoxides means that two compositions are selected from one, or more than one, of the listed categories. The use of the word "composition" in this context means that the selected material may be a mixture of compounds, In one preferred embodiment, the epoxy composition comprises greater than 50 percent by weight of one or more epoxy compositions comprising epoxidized vegetable oils, epoxidized alkyl esters or cycloaliphatic epoxides and 50 percent by weight or less of aromatic epoxides or epoxy functionalized polyoxyalkylene polyols.

In another embodiment, the invention is an epoxy resin composition comprising two or more epoxy resin compositions selected from the group of epoxidized vegetable oil compositions, epoxidized alkyl ester compositions, cycloaliphatic epoxide compositions, aromatic epoxide compositions and polyoxyalkylene oxide compositions wherein the composition has an average oxirane number of 8.8 or less and a viscosity of 1000 (1.0 Pa.s) cps or less.

In another embodiment, the invention is a composition comprising a blend of two or more epoxide compositions wherein at least one is selected from epoxidized vegetable oils, epoxidized alkyl esters, or cycloaliphatic epoxides and at least one may be selected from an aromatic epoxide or an epoxidized polyoxyalkylene polyol wherein the average oxirane number 8.8 or less and the viscosity is 1000 centipoise (1 Pa.s) or less.

A more preferred epoxy resin composition comprises in one part epoxidized linseed oil and/or octyl epoxytallate and a liquid epoxy resin. Preferably, the first part is present in an amount of 50 percent by weight or greater of the composition. In another embodiment the epoxy composition comprises a blend of epoxidized linseed oil and octyl epoxytallate. Preferable, the two epoxy components are present in a weight ratio of 3:1 to 1:3, and most preferably 1:1.

The epoxy compositions of the invention are useful as additives in surface improvers used in unsaturated thermosetting resin compositions, such as polyester and vinyl ester resin based compositions.

In another embodiment the invention is a novel composition useful as a surface improver for unstaturated thermosetting resin compositions which composition comprises an epoxy resin composition of this invention, a thermoplastic additive comprising a thermoplastic polymer, preferably having a weight average molecular weight of from 10,000 to 400,000 g/g mole; and a compound capable of dissolving the thermoplastic additive and epoxy composition. Preferably, such compound is a crosslinking monomer capable of copolymerizing with unsaturated thermosetting resins.

In yet another embodiment the invention is a thermosetting resin composition comprising:
 a) one or more unsaturated thermosetting resins;
 b) one or more crosslinking monomers; and
 c) a surface improver composition as described herein.

Preferably the surface improver composition comprises 25 parts to 45 parts by weight and preferably 30 to 40 parts of 100 parts of components a), b) and c).

In yet another embodiment the invention comprises molded parts comprising components a), b) and c), wherein the surface of the molded object has improved surface smoothness as compared to molded parts which do not contain part c).

Blends of epoxy compounds of the invention, such as a blend of epoxidized linseed oil and octyl epoxytallate, when used in a thermosetting composite, such as polyester or vinyl ester based reinforced composite, provide improved surface smoothness of a molded panel of said composition. Additionally a 50/50 blend of two epoxy compounds provide better surface smoothness than either epoxy compound alone or other blend ratios.

The surface improver composition comprises a thermoplastic additive present in an amount from 12 to 35 parts by weight, preferable from 16 to 30 parts by weight, and more preferably from 20 to 27 parts by weight; an epoxy composition present in an amount from 12 to 25 parts by weight, preferably from 32 to 23 parts by weight, and more preferably from 10 to 16 parts by weight; a crosslinking monomer present in an amount from 40 to 87 parts by weight, preferably 47 to 81 parts by weight, and more preferably from 57 to 70 parts by weight wherein there are 100 total parts by weight. Weights are based on the weight of the thermoplastic additive, epoxy composition, and crosslinking monomer. Preferably, the amount of each component is chosen so as to form a single phase system.

The unsaturated thermosetting resins suitable for use in accordance with the present invention include those unsaturated polymeric materials which can be crosslinked to form thermoset articles. Typically, the unsaturated thermosetting resins have an average molecular weight of at least 500, preferably from 500 to 10,000 grams per gram mole ("g/gmole"). As used herein the term average molecular weight means weight average molecular weight. Methods for determining weight average molecular weight are known to those skilled in the art. One preferred method for determining weight average molecular weight is gel permeation chromatography.

Typical unsaturated thermosetting resins include, for example, polyesters, vinyl esters, epoxy diacrylates, polyester diacrylates, polyurethane diacrylates, acrylate capped polyurethane polyacrylates, acrylated polyacrylates, acrylated polyethers and the like. Especially preferred thermosetting resins include polyesters and vinyl esters. As used herein, the term "polyesters" includes vinyl esters. Such unsaturated thermosetting resins are commercially available or alternatively can be readily prepared by those skilled in the art. Examples of suitable unsaturated thermosetting resins for use in accordance with the present invention are described for example in U.S. Pat. Nos. 4,172,059 and 4,942,001, incorporated herein by reference.

One or more unsaturated thermosetting resins may be employed in the molding compositions of the present invention. The total amount of unsaturated thermosetting resins in the molding compositions of the present invention. The total amount of unsaturated thermosetting resins in the molding compositions of the present invention is typically from 15 to 80 parts by weight, preferably from 20 to 60 parts by weight, and more preferably from 25 to 50 parts by weight based on the weight of the unsaturated thermosetting resin, thermoplastic additive, epoxide composition and crosslinking monomer. Further details concerning the selection and amounts of unsaturated thermosetting resins are known to those skilled in the art.

The crosslinking monomers suitable for use in accordance with the present invention include materials which are copolymerizable with the unsaturated thermosetting resins. The crosslinking monomer also serves the function of dissolving the thermosetting resin thereby facilitating its interaction with the other components of the molding composition. Preferably, the monomer contains olefinic unsaturation, more preferably ethylenic unsaturation. Typical olefinically unsaturated monomers include, for example, styrene, vinyl toluene isomers, methyl methacrylate, acrylonitrile and substituted styrene such as, for example, chlorostyrene and alphamethylstyrene. Multifunctional monomers, such as, for example, divinylbenzene or multifunctional acrylates or methacrylates may also be employed. Styrene is a preferred monomer for use in the compositions of the present invention. One or more crosslinking monomers may be used in the molding compositions of the present invention. Typically, the total amount of the crosslinking monomer is from 20 to 80 parts by weight, preferably from 30 to 65 parts by weight, and more preferably from 40 to 55 parts by weight based on the weight of the unsaturated thermosetting resin, thermoplastic additive, epoxy resin composition and crosslinking monomer. Such monomers are readily commercially available. Further details concerning the selection and amounts of the crosslinking monomers are known to those skilled in the art.

One or more thermoplastic additives may be employed in the molding compositions of the present invention. Typically, the total amount of the thermoplastic additive is from 3 to 30 parts, preferably from 5 to 25 parts, and more preferably from 8 to 20 parts based on the weight of the unsaturated thermosetting resin, thermoplastic additive, epoxide composition and crosslinking monomer. Examples of the thermoplastic additives suitable for use in accordance with the present invention are described, for example, in U.S. Pat. No. 4,172,059, incorporated herein by reference. Such thermoplastic additives are commercially available or alternatively can be prepared by those skilled in the art. Further details concerning the selection and amounts of the thermoplastic additives are known to those skilled in the art.

The average molecular weights of the thermoplastic additives of the present invention are 10,000 g/gmole or greater, preferably 25,000 or greater, more preferably from 50,000 or greater and most preferably 80,000 or greater. The average molecular weights are preferable 400,000 g/gmole or less, more preferably 300,000 or less, even more preferably 250,000 or less and most preferably 200,000 or less. These thermoplastic additives can be used in conjunction with lower molecular weight materials which can enhance their shrinkage control ability such as epoxies, lower reactivity secondary monomers and others. Examples of such approaches are disclosed in U.S. Pat. Nos. 4,525,498, 4,755,557, and 4,374,215, incorporated herein by reference.

The epoxy compounds of this invention can be based on aliphatic, cycloaliphatic, or aromatic backbones. Preferred epoxy resins are liquid at room temperature. One class of preferred epoxy resins are epoxidized vegetable oils. Vegetable oils are naturally occurring triglycerides (triesters of glycerol and mixed unsaturated fatty acids). Among preferred vegetable oils are linseed oil, soybean oil, safflower oil, corn oil, cottonseed oil, rapeseed oil and peanut oil. Theses oils can be epoxidized at unsaturated sites to produce epoxidized vegetable oils using processes well known to those of average skill in the art. More preferred vegetable oils are soybean and linseed oil, with linseed oil most preferred. Synthetic versions or refined versions of these epoxidized vegetable oils may be used in the invention.

Epoxidized alkyl esters are epoxidized versions of natural esters of fatty acids. Preferred epoxidized alkyl esters are derived from alkyl esters of oleic or tall oil fatty acids or from alkyl epoxy stearates. A more preferred class are the epoxidized tall oil fatty acids, commonly referred to epoxy tallates. Synthetic or refined versions of epoxidized alkyl esters may be used in this invention.

Cycloaliphatic epoxides as used herein refer to epoxy compositions containing compounds having cycloaliphatic resins with an oxirane ring attached or fused to the cycloaliphatic ring. Preferably, the oxirane ring is fused to the cycloaliphatic ring. A more preferred cycloaliphatic ring is an epoxy cyclohexane (epoxy cyclohexyl) which is represented by the formula

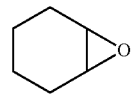

Preferred cycloaliphatic epoxide containing compositions contain compounds with an average of one or more, preferably on average of two or more cycloaliphatic moieties with epoxide groups fused or attached. Among preferred cycloaliphatic epoxides are 3,4-Epoxycyclohexylmethyl 3,4-epoxycyclohexane-carboxylate, available from The Dow Chemical Company under the trade designation ERL-4221 E; bis(3,4-epoxycyclohexyl methyl) adipate available from The Dow Chemical Company under the trade designation ERL-4299 and 1,2-Epoxy-4-vinylcyclohexane available from The Dow Chemical Company.

Aromatic epoxides as used herein refer to compositions containing compounds having aromatic moieties with epoxide moieties attached thereto. Among preferred aromatic epoxides are novolac and bisphenol based aromatic epoxides. Representative of preferred bisphenol resins useful in this invention are those disclosed in U.S. Pat. No. 5,308,895 at column 8, line 6 and represented by Formula 6. Relevant portions of such patent are incorporated herein by reference. Preferably, the aromatic epoxide is a liquid epoxy resin. The most preferred aromatic epoxy resins are bisphenol-A and bisphenol-F based epoxy resins.

The epoxide terminated polyoxyalkylene polyols comprise compositions containing compounds wherein a polyoxyalkylene chain is functionalized with one or more epoxide moieties. The polyoxyalkylene chains are preferably prepared from one or more epoxide moieties. The polyoxyalkylene chains are preferably prepared from one or more alkylene oxides. Representative examples of polyalkylene based epoxy resins are those described in U.S. Pat. No. 5,308,895 at column 8, line 9 and formula 9 and the description thereof following. Relevant portions of such description are incorporated herein by reference. Preferably, the polyoxyalkylene epoxide is derived from an ethylene oxide, propylene oxide or mixture thereof.

In one embodiment, the compositions of the invention preferably comprise a mixture of two or more epoxide compositions where at least two are selected from different groups comprising epoxidized vegetable oils, epoxidized alkyl esters and cycloaliphatic epoxides. A most preferred blend is a blend of an epoxidized vegetable oil and an epoxidized alkyl ester. Preferably, at least one of the epoxides in the composition is an epoxidized vegetable oil. Preferably, all of the epoxides contained in the compositions are selected from epoxidized vegetable oil, epoxidized alkyl esters and cycloaliphatic epoxides. More preferably, the blend of epoxides used contains an epoxidized vegetable oil and most preferably epoxidized linseed oil.

It has been discovered that a blend of epoxides which have an oxirane number of 8.8 or less and a viscosity of 1000 centipoise or less exhibits a surface waviness which is at least 10 percent lower, than if either or both of the epoxide compositions exhibit an oxirane number is greater that 8.8 and viscosity which is greater than 1000 centipoise.

Preferably, the blend of epoxide compositions comprises at least 25 percent by weight of at least 2 epoxide compositions, based on the weight of the epoxide compositions, and more preferably 33 percent by weight of at least two epoxide compositions, and most preferably 45 percent by weight or greater least two epoxide compositions. Preferably, the epoxide composition blend contains no more than 75 percent of one of the epoxide compositions, based on the weight of the epoxide compositions, and more preferably no more than 67 percent by weight of one epoxide composition and even more preferably no more than 55 percent by weight or less. In a most preferred embodiment, the epoxide blend is a blend of 50 percent of one epoxide composition and 50 percent of a second epoxide composition.

The preferred concentration of total epoxy compounds is 1 to 25 parts per hundred parts of the epoxy composition thermosetting resin, crosslinking monomer and thermoplastic additive, more preferred 2 to 10 parts per hundred parts and even more preferred 3 parts to 8 parts per hundred parts.

Thickening agents may also be employed in the compositions of the invention. Such materials are known in the art and include the oxides and hydroxides of the metals of Group I, II and III of the Periodic Table. Examples of preferred thickening agents include magnesium oxide, calcium oxide, calcium hydroxide, zinc oxide, barium oxide, magnesium hydroxide and the like, including mixtures of the same. Thickening agents are normally employed in proportions of from bout 0.1 to 6 weight percent based on the weight of the thermosetting resin, crosslinking monomer, thermoplastic additive and epoxide composition.

Alternatively, a dual thickening system may be employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups but not more than seventy-five percent of the carboxyl groups present.

The fiber reinforcements which are often employed in the molding compositions of the invention can be, for example, any of those known to the art for use in molding compositions. Examples of such materials are glass fibers or fabrics, carbon fibers and fabrics, asbestos fibers or fabrics, various organic fibers and fabrics such as those made of polypropylene, acrylonitrile/vinyl chloride copolymer, and others known to the art. These reinforcing materials are typically employed in the molding compositions at a level of from 5 to 80 weight parts, based on the total weight of the composition and preferably 15 to 50 weight parts.

In addition to the above-described ingredients, the molding compositions of the present invention also frequently contain pigment. The amount of pigment may vary widely, depending on the particular molding composition and pigment used. The pigment is typically employed in the range of 0.5 to 15 weight parts based on the total weight of the composition.

The molding compositions of the invention may also contain one or more other conventional additives, which are employed for their known purposes in the amounts known to those skilled in the art. There following are illustrative of such additives:

1. Polymerization initiators such as t-butyl hydroperoxide, t-butyl perbenzoate, benzoyl peroxide, t-butyl peroctoate, cumene hydroperoxide, methyl ethyl ketone peroxide, peroxy ketals, and others known to the art, to catalyze the reaction between the olefinically unsaturated monomer and the thermosetting resin. The polymerization initiator is employed in a catalytically effective amount, such as from 0.3 to 3 parts, based on the weight of the unsaturated thermosetting resin, thermoplastic additive, and crosslinking monomer.
2. Fillers such as clay, alumina trihydrate, silica, calcium carbonate, and others known to the art;
3. Mold release agents or lubricants, such as zinc stearate, calcium stearate, and others known to the art, and
4. Water.

One especially preferred molding composition in accordance with the present invention comprises:

(i) from 20 to 60, preferably 27 to 35 weight parts based on the weight of the unsaturated thermosetting resin, thermoplastic additive, and crosslinking monomer of an unsaturated polyester and epoxide compositions;
(ii) from 30 to 65, preferably 47 to 55, weight parts based on the weight of the unsaturated thermosetting resin, thermoplastic additive, epoxide composition and crosslinking monomer of an olefinically unsaturated monomer which is copolymerizable with the unsaturated polyester;
(iii) from 5 to 25, preferably 10 to 14, weight parts based on the weight of the unsaturated thermosetting resin, thermoplastic additive, epoxy composition and crosslinking monomer of a polyvinyl acetate homopolymer or copolymer having a weight average molecular weight of from 70,000 or greater, more preferably 80,000 g/gmole or greater and preferably 250,000 or less and more preferably 200,000 grams per gram mole or less and;

(iv) from 2 to 10, preferably 3 to 8, weight parts based on the weight of the unsaturated thermosetting resin, thermoplastic additive, epoxy composition and crosslinking monomer.

The molding compositions of the present invention can be prepared by methods known to those skilled in the art, such as for example, mixing the components in a suitable apparatus such as Hobart mixer at temperatures on the order of 20° C. to 50° C. The components may be combined in any convenient order. Generally, it is preferable that the thermosetting resin and thermoplastic additive are added in liquid form by preparing a solution thereof in the crosslinking monomer. All the liquid components are then typically mixed together before adding the fillers, thickening agents and optional ingredients.

Once formulated, the molding compositions can be molded into thermoset articles of the desired shape, for example, automotive fenders, hoods, bathtubs, doors, and the like. The specific conditions used in the molding process depend on the composition being molded as well as upon the nature of the particular articles desired, the details of which are known to those skilled in the art.

The molding compositions are suitable for use, for example, as sheet molding compounds and bulk molding compounds, with sheet molding compounds being more typical. For example, sheet molding compound can be produced by laying down a first layer of the molding composition, that is, paste, on a first layer of polyethylene film or the equivalent thereof, laying on this first layer of the paste filler reinforcements such as chopped glass fibers, and laying thereover a second layer of the paste. The two layers of the paste with the filler reinforcements sandwiched therebetween are then topped with a second sheet of polyethylene film and the resulting composite (sheet molding compound) is stored. Further details concerning the manufacture, handling and use of sheet molding compounds and bulk molding compounds are known to those skilled in the art.

The following examples are provided for illustrative purposes and are not intended to limit the scope of the claims which follow. All parts and percentages are by weight unless otherwise specified.

The following materials and terms were used in the examples set forth below:

GLOSSARY

S342 is a highly reactive unsaturated polyester resin sold by Alpha Owens Corning and is used for automotive SMC applications.
BMC stands for bulk molding composition.
CM-2015 is a 35 percent carbon black pigment dispersion available from Plasticolors, Inc., Ashtabula, Ohio.
Modifier E is a 5 percent solution of parabenzoquinone in diallylphthalate.
Luperox P is a 98 percent, solution of t-butylperoxy benzoate sold by Elf Atochem North America, Philadelphia Pa.
VR-3 is a viscosity reducer for SMC/BMC sold by The Dow Chemical Company, Mildland, Mich.
Maglite D is a technical grade magnesium oxide sold by marine Magnesium Company.
LPA refers to low profile additive.
Neulon G is a proprietary carboxylated poly(vinyl acetate) manufactured and sold by The Dow Chemical Company, Midland, Mich.
LP-90 is a 40 percent solution of poly(vinyl acetate) homopolymer dissolved in styrene and sold by The Dow Chemical Company, Midland, Mich.
Hubercarb W4 is a calcium carbonate of 5 micron particle size sold by J.M Huber Company.
SMC stands for sheet molding compound.
SWI stands for surface waviness index as measured by a Diffracto D-sight audit station produced and sold by Diffracto Ltd.
UPE stands for unsaturated polyester.
ON stands for oxirane number.
A-Paste is the portion of the formulation containing either some or all of the thermosetting resin, the crosslinking monomer, the thermoplastic additive, the polymerization initiators, the mold release agents, the pigments, the filler, etc.
B-Paste is the portion of the formulation containing either some or all of the vehicle, the pigment, the crosslinking monomer, the thickeners, the filler, etc.
PPG 5509 is a fiber glass reinforcement sold by PPG Industries.

Procedure for Preparation of Sheet Molding Compound (SMC) Formulations

All the liquid components were weighed individually into a five gallon open top container placed on a Mettler balance. The contents of the container were then mixed with a high speed Cowles type dissolver. The agitator was started a slow speed, then increased to medium speed to completely mix the liquids over a period of 2-3 minutes. The mold release agent was next added to the liquids and mixed until completely dispersed. The filler was next added gradually until a consistent paste was obtained and the contents were then further mixed to a minimum temperature of 90° F. (32° C.). The thickening agent was next mixed into the paste over a period of 2-3 minutes. The paste was next added to doctor boxes on a sheet molding compound (SMC) machine where the paste is metered into a film on the carrier sheet where it is further combined with fiber glass (1 inch (2.54 cm) fibers). The sheet molding compound was then allowed to mature to molding viscosity.

Preparation of Molding Test Panels

Flat panels for surface evaluation were molded on a 200 ton (8181 metric ton) Lawton press containing a matched die set of 18" by 18" (47×47 cm) chrome plated molds. The female cavity is installed in the bottom and the male portion is at the top. Both molds are hot oil heated and are controlled so that they can be operated at different temperatures. For the present molding, the top and bottom temperatures were 295° F. to 305° F. (146 to 151° C.). 1200 g samples of molding compound were employed, and the molded part thickness was 2.120" (0.30 cm). The molding pressure, which can be varied from 0 to 1000 psi (0 to 6895 kPa), was run at maximum pressure. The panels were laid on a flat surface, weighed to keep them flat, and allowed to cool overnight.

Procedure for Determining Surface Smoothness of Molded Panels

Surface quality measurements were performed on a Diffracto D-sight Audit Station-2 manufactured and sold by the Diffracto Co., Ltd. The surface waviness index (SWI) provided by this instrument is the standard deviation of the panel's surface with regard to long term waviness, as compared to the surface of a perfectly flat panel, whose long term waviness is zero. The smaller the SWI number, the smoother the panel.

EXAMPLE 1

Table 1 showed SMC formulations utilizing expoxidized linseed oil, octyl epoxytallate, and blends of the same. In Table 1 all number were parts by weight. In preparing the SMC, 72 percent of the composition described was blended with 28 percent by weight of PPG 5509 glass fibers. The B side comprised LP-90, 29.90 percent; Styrene, 12.80 percent; Maglite D, 9.90 percent, CM-2015, 0.50 percent and Hubercarb W4, 46.90 percent. Table 2 showed the surface waviness index of the molded panels as determined on the Diffracto D-sight audit station. The 50/50 blend of the epoxy compounds gave a smother surface (lower surface waviness index) than either epoxy compound alone at other blend ratios.

TABLE 1

SMC Formulations Utilizing Epoxy Compounds

|  | 1 | 2 | 3 | 4 | 5 |
|---|---|---|---|---|---|
| S342 | 55 | 55 | 55 | 55 | 55 |
| Neulon-G | 35 | 35 | 35 | 35 | 35 |
| Styrene | 10 | 10 | 10 | 10 | 10 |
| Epoxidized linseed oil | 0 | 1.5 | 3 | 4.5 | 6 |
| Octyl epoxytallate | 6 | 4.5 | 3 | 1.5 | 0 |
| Modifier E | 0.4 | 0.4 | 0.4 | 0.4 | 0.4 |
| Luperox P | 1.8 | 1.8 | 1.8 | 1.8 | 1.8 |
| Zinc Stearate | 2.5 | 2.5 | 2.5 | 2.5 | 2.5 |
| VR3 | 2 | 2 | 2 | 2 | 2 |
| Hubercarb W4 | 215 | 215 | 215 | 215 | 215 |
| B-Side | 7.3 | 7.3 | 7.3 | 7.3 | 7.3 |
| LP-90 | 29.9 percent | | | | |
| Styrene | 12.8 percent | | | | |
| Maglite D | 9.9 percent | | | | |
| CM-2015 | 0.5 percent | | | | |
| Hubercard W4 | 46.9 percent | | | | |
| PPG 5509 | 28 percent | 28 percent | 28 percent | 28 percent | 28 percent |

TABLE 2

Surface Waviness Index of Formulation in Table 1

| Epoxidized Linseed oil, pts | Octyl epoxytallate, pts | Waviness Index |
|---|---|---|
| 0 | 6 | 272 |
| 1.5 | 4.5 | 222 |
| 3 | 3 | 184 |
| 4.5 | 1.5 | 213 |
| 6 | 0 | 273 |

Several samples were prepared and tested for surface waviness as described hereinbefore. The oxirane number was determined on each sample according to the procedure described in ASTM D1652 Standard Test Methods for Epoxy Content of Epoxy Resins, Test Method B. The viscosity was determined using a Brookfield viscometer at ambient temperature. The results were complied in Table 3.

TABLE 3

| Epoxide | SWI | Visc. (cps) | (Pa · s) | ON |
|---|---|---|---|---|
| Octyl Epoxy Tallate[1] | 272 | 27 | 0.027 | 4.6 |
| Octyl Epoxy Ester[2] | 214 | 32.5 | (0.0325) | 5.77 |
| Octyl Epoxy Tallate[1]/Bisphenol based Epoxy resin 1[3] | 222 | 160 | (0.160) | 6.3 |
| Octyl Epoxy Tallate[1]/Bisphenol based Expoxy resin 2[4] | 227 | 100 | (0.100) | 6.65 |
| Epoxidized Linseed Oil[5]/Octyl Epoxy Tallate[1] | 184 | 128 | (0.128) | 7.1 |
| Epoxidized Linseed Oil[5]/Octyl Epoxy Ester[2] | 160 | 85 | (0.085) | 7.71 |
| Octyl Epoxy Tallate[1]/Cycloaliphatic Epoxide[6] | 208 | 70 | (0.070) | 8.1 |
| Bisphenol based epoxy resin 1[3] | 275 | 16100 | 16.100 | 8.2 |
| Bisphenol based epoxy resin 3[7] | 231 | 13700 | 13.700 | 8.4 |
| Bisphenol based epoxy resin 1[3]/Bisphenol based epoxy resin 4[8] | 224 | 11700 | 11.700 | 8.7 |
| Bisphenol based epoxy resin 1[3]/Bisphenol based epoxy resin 2[4] | 347 | 8500 | 8.500 | 8.9 |
| Bisphenol based epoxy resin 2[4] | 241 | 6800 | 6.800 | 9 |

TABLE 3-continued

| Epoxide | SWI | Visc. (cps) | (Pa · s) | ON |
|---|---|---|---|---|
| Bisphenol based epoxy resin 4[8] | 199 | 11500 | 11.500 | 9 |
| Epoxidized Linseed Oil[5]/Bisphenol based epoxy resin 1[3] | 209 | 1430 | 1.430 | 9.33 |
| Bisphenol based epoxy resin 2[4] | 232 | 1210 | 1.210 | 9.35 |
| Epoxidized Linseed Oil[5] | 273 | 682 | .682 | 9.648 |
| Epoxidized Linseed Oil[5]/Cycloaliphatic Epoxide[6] | 196 | 502 | .502 | 10.6 |
| Cycloalihatic epoxide[6] | 263 | 337 | .337 | 11.6 |

[1]Available from Witco under the trademark DRAPEX 4.4.
[2]Available from Atofina under the trademark VIKOFLEX 4050.
[3]Available form The Dow Chemical Company under the Trademark and designation DER 331 and was a standard, nondiluted, low molecular weight liquid epoxy resin having an EEW of 182-192.
[4]Available form The Dow Chemical Company under the Trademark and designation DER 332 and was a low epoxide equivalent weight, high purity diglycidyl ether of bisphenol-A. Low viscosity and color having an EEW of 171-175.
[5]Available from The Dow Chemical Company under the trademark FLEXOL LOE.
[6]3,4-epoxycyclohexylmethyl 3,4-epoxycylohexane-carboxylate available form The Dow Chemical company under the Trademark and designation ERL-4221.
[7]Available from The Dow Chemical Company under the Trademark and designation DER 383 which is low viscosity liquid epoxy resin having an EEW of 1176-183.
[8]Available form The Dow Chemical Company under the Trademark and designation DER 330, which is low viscosity, undiluted, low epoxide equivalent weight liquid epoxy resin having an EEW of 176-185. EEW means epoxy equivalent weight.

Table 3 illustrated that compositions containing blends of epoxidized vegetable oils, epoxy alkyl esters and cycloaliphatic epoxides with one another and with aromatic epoxides demonstrated lower surface waviness indices than compositions containing an individual class of epoxides. Data from Table 3 was represented below to better illustrate this.

|  | SWI |
|---|---|
| Octyl Epoxy Ester | 214 |
| Blend | 160 |
| Epoxidized LO | 273 |
| Bisphenol-A Epoxy1[3] | 275 |
| Blend | 209 |
| Epoxidized LO | 273 |
| Bisphenol-A Epoxy2[4] | 241 |
| Blend | 232 |
| Epoxidized LO | 273 |
| Octyl Epoxy Tallate | 272 |
| Blend | 184 |
| Epoxidized LO | 273 |
| Bisphenol-A Epoxy 1[3] | 275 |
| Blend | 222 |
| Octyl Epoxy Tallate | 272 |
| Bisphenol-A Epoxy 2[4] | 274 |
| Blend | 227 |
| Octyl Epoxy Tallate | 272 |
| Bisphenol-A Epoxy 1[3] | 241 |
| Blend | 347 |
| Bisphenol-A Epoxy 2[4] | 275 |
| Epoxidized linseed oil | 273 |
| Blend | 196 |
| Cycloaliphatic epoxide | 263 |
| Octyl epoxy tallate | 272 |
| Blend | 208 |
| Cycloaliphatic | 263 |

The data in Table 3 was statistically analyzed to examine two parameters, first epoxide oxirane number greater that 8.8 and less than 8.8 and second viscosity less than 1000 (1.0 Pa.s) and greater than 1000 cps (1.0 Pa.s). The average surface waviness index of formulations containing epoxides and epoxide blends meeting these criteria were segregated into four groups based on these criteria and averaged. The results were shown below.

| Average Surface Waviness (SWI) | | |
|---|---|---|
| Epoxide(s) Oxirane Number | Greater than 8.8 | 245 | 246 |
| | Less than 8.8 | 213 | 243 |
| | | Less Than 1000 (1.0 Pa · s) Epoxide(s) | Greater Than 1000 (1.0 Pa · s) Viscosity, cps |

These data demonstrated that a blend of epoxides having an oxirane number of 8.8 or less and a viscosity of 1000 cps (1.0 Pa.s) or less gave the best surface waviness index numbers.

What is claimed is:

1. A surface improver composition for unsaturated thermosetting resin compositions, the surface improver composition comprising an epoxy resin composition having a blend of epoxidized linseed oil and octyl epoxytallate having a ratio of epoxidized linseed oil:octyl epoxytallate of 3:1 to 1:3, a thermoplastic additive comprising a thermoplastic polymer, and a compound capable of dissolving the thermoplastic additive and epoxy composition.

2. The surface improver composition of claim 1 wherein the compound capable of dissolving the thermoplastic resin and epoxy composition is a cross linking monomer capable of copolymerizing with unsaturated thermosetting resins.

3. The surface improver composition of claim 2 wherein the thermoplastic additive is present in an amount of 12 to 35 parts by weight, the epoxy composition is present in an amount of 1 part to 25 parts by weight and the cross linking monomer is present in an amount of 40 parts to 87 parts by weight wherein there are a total of 100 parts by weight.

4. The surface improver composition of claim 1 wherein the ratio of epoxidized linseed oil:octyl epoxytallate is 1:1.

5. The surface improver composition of claim 1 having an oxirane number of 8.8 or less and a viscosity of 1000 cps (1.0 Pas) or less.

6. An unsaturated thermosetting resin composition comprising: a) one or more unsaturated thermosetting resins; b) one or more cross linking monomers; and c) a surface improver composition according to claim 1.

7. The composition of claim 6 wherein the surface improver composition comprises 25 to 45 parts of 100 parts of components a), b) and c).

8. Molded parts comprising the composition of claim 6 wherein the surface of the molded object has improved surface smoothness as compared to molded parts which do not contain part c).

* * * * *